US010860905B1

(12) United States Patent
Gligan et al.

(10) Patent No.: US 10,860,905 B1
(45) Date of Patent: Dec. 8, 2020

(54) LONG RUNNING WORKFLOWS FOR DOCUMENT PROCESSING USING ROBOTIC PROCESS AUTOMATION

(71) Applicant: UiPath, Inc., New York, NY (US)

(72) Inventors: Ioana Gligan, Cluj-Napoca (RO); Paul Parau, Sibiu (RO); Remus Rusanu, Redmond, WA (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 16/654,653

(22) Filed: Oct. 16, 2019

(51) Int. Cl.
*G06F 3/12* (2006.01)
*G06K 15/02* (2006.01)
*G06Q 10/06* (2012.01)
*G06F 16/93* (2019.01)
*G06F 16/338* (2019.01)
*G06K 9/20* (2006.01)

(52) U.S. Cl.
CPC ....... *G06K 15/1856* (2013.01); *G06F 16/338* (2019.01); *G06F 16/93* (2019.01); *G06K 9/2081* (2013.01); *G06Q 10/0633* (2013.01); *G06Q 10/06316* (2013.01); *G06Q 10/063114* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 8,375,389 B2 | 2/2013 | Allen et al. | |
| 9,754,231 B2 | 9/2017 | Channabasavaiah et al. | |
| 10,372,508 B2 | 8/2019 | Hosabettu et al. | |
| 2010/0064357 A1 | 3/2010 | Baird et al. | |
| 2017/0270431 A1 | 9/2017 | Hosabettu et al. | |
| 2017/0352041 A1* | 12/2017 | Ramamurthy | ......... G06N 20/00 |
| 2018/0232204 A1 | 8/2018 | Ghatage et al. | |
| 2019/0066013 A1 | 2/2019 | Gupta et al. | |
| 2019/0087395 A1* | 3/2019 | Priestas | ................. G06F 16/288 |
| 2019/0138596 A1* | 5/2019 | Singh | ...................... G06F 9/453 |
| 2019/0147382 A1 | 5/2019 | Krishnamurthy | |

(Continued)

OTHER PUBLICATIONS

Long Running Workflow—Human Interaction, initially retrieved online on Aug. 30, 2019, at https://www.flexrule.com/process-automation/, 5 pgs.

(Continued)

*Primary Examiner* — Henok Shiferaw
(74) *Attorney, Agent, or Firm* — Chiesa Shahinian & Giantomasi PC

(57) ABSTRACT

Systems and methods for executing a robotic process automation (RPA) workflow for document processing are provided. An input document is processed by a first robot executing one or more document processing activities of the RPA workflow. The document processing activities may include optical character recognition, digitization, classification, or data extraction. Execution of the RPA workflow is suspended by the first robot in response to a user validation activity of the RPA workflow. The user validation activity provides for user validation of the results of the one or more document processing activities. A user request that requests validation of the results from an end user is generated and the user request is transmitted to the end user. The execution of the RPA workflow is resumed by a second robot based on the validation received from the end user.

30 Claims, 7 Drawing Sheets

(56) References Cited

U.S. PATENT DOCUMENTS

2019/0155225 A1    5/2019  Kothandaraman et al.
2019/0205636 A1*   7/2019  Saraswat .............. G06F 16/93
2019/0286736 A1*   9/2019  Sturtivant .......... G06F 16/2358
2020/0134524 A1*   4/2020  Gentilhomme .. G06Q 10/06311

OTHER PUBLICATIONS

RPA—Robotics Automation Process, initially retrieved online on Aug. 29, 2019, at https://www.flexrule.com/robotics/?q=/rpa/&, 4 pgs.
Managed ROC—Robotic Operations Center, Accelirate Inc., initially retrieved online on Aug. 29, 2019, at https://www.accelirate.com/wp-content/uploads/2019/01/Managed-ROC.pdf, 2 pgs.
User Guide—Kryon Console v5.19, Kryon Systems Ltd., initially retrieved online on Aug. 29, 2019, at https://us.v-cdn.net/6030908/uploads/editor/8h/t3jiixqx97t2.pdf, 89 pgs.
Understanding the RPA Monitor BOTs View, initially retrieved online on Aug. 29, 2019, at https://jacada.zendesk.com/hc/en-us/articles/360001675452, 5 pgs.
Pega Robot Manager, Pegasystems, Inc., initially retrieved online on Sep. 9, 2019, at https://community.pega.com/marketplace/components/pega-robot-manager, 4 pgs.
Intellibot RPA Platform, Uber Techlabs, initially retrieved online on Sep. 9, 2019, at https://intellibot.io/, 10 pgs.
Robotic Process Automation (RPA), NICE Robotic Automation, initially retrieved online on Sep. 5, 2019, at https://www.nice.com/websites/rpa/robotic-automation.html. 7 pgs.
YouTube Video "Power Your Document Processes with RPA," Kofax, Inc., uploaded on Nov. 8, 2018, initially retrieved online on Sep. 5, 2019, at https://www.youtube.com/watch?v=cvCxM2mYeCo, Digital Video, 1 pgs.

* cited by examiner

500

```
┌─────────────────────────────────────────────┐
│ Execute one or more document processing     │
│ activities of the long running RPA workflow │
│ by a first robot to process an input        │
│ document                                    │
│ 502                                         │
└─────────────────────────────────────────────┘
                      │
                      ▼
┌─────────────────────────────────────────────┐
│ Suspend execution of the long running RPA   │
│ workflow by the first robot in response to  │
│ a user validation activity of the long      │
│ running RPA workflow                        │
│ 504                                         │
└─────────────────────────────────────────────┘
                      │
                      ▼
┌─────────────────────────────────────────────┐
│ Generate a user request requesting          │
│ validation of the results from an end user  │
│ 506                                         │
└─────────────────────────────────────────────┘
                      │
                      ▼
┌─────────────────────────────────────────────┐
│ Transmit the user request to the end user   │
│ 508                                         │
└─────────────────────────────────────────────┘
                      │
                      ▼
┌─────────────────────────────────────────────┐
│ Resume the execution of the long running    │
│ RPA workflow by a second robot based on the │
│ validation received from the end user       │
│ 510                                         │
└─────────────────────────────────────────────┘
```

LONG RUNNING WORKFLOWS FOR DOCUMENT PROCESSING USING ROBOTIC PROCESS AUTOMATION

TECHNICAL FIELD

The present invention relates generally to robotic process automation, and more particularly to long running workflows for document processing using robotic process automation.

BACKGROUND

Robotic process automation (RPA) is a form of process automation that uses software robots to automate workflows. RPA may be implemented to automate repetitive and/or labor-intensive tasks, thereby reducing costs and increasing efficiency. One exemplary application of RPA is document processing. Document processing refers to operations performed on a document in order to structure some or all of the information in the document.

Often times, document processing results in errors due to the optical character recognition process or other document processing methods. Accordingly, results of document processing are typically manually validated by a user. Conventionally, incorporation of such manual validation into an RPA workflow by an RPA developer is a labor intensive process. In particular, the incorporation of manual validation into an RPA workflow conventionally involves the RPA developer synchronizing multiple distinct workflows, such as a document processing workflow, a user validation workflow, and a post-processing workflow, or the RPA developer generating one large complex workflow that requires a user performing the validation to wait for the document processing workflow and the post-processing workflow. It is therefore difficult to incorporate manual validation in an RPA workflow.

BRIEF SUMMARY OF THE INVENTION

In accordance with one or more embodiments, systems and methods for executing a robotic process automation (RPA) workflow for document processing are provided. An input document is processed by a first robot executing one or more document processing activities of the RPA workflow. The document processing activities may include optical character recognition, digitization, classification, or data extraction. Execution of the RPA workflow is suspended by the first robot in response to a user validation activity of the RPA workflow. The user validation activity provides for user validation of the results of the one or more document processing activities. A user request that requests validation of the results from an end user is generated and the user request is transmitted to the end user. A notification indicating that validation of the results is requested may also be transmitted to the end user. The execution of the RPA workflow is resumed by a second robot based on the validation received from the end user. The first robot and the second robot may be the same robot or different robots.

In one embodiment, the validation of the results received from the end user may be an indication of whether the results are accurate, or corrected results of the one or more document processing activities.

In one embodiment, a user interface is caused to be displayed depicting the input document and the results for presentation to the end user. The input data and the results of the one or more document processing activities may be displayed in a side-by-side configuration. A selection of a particular result may be received from the end user and the particular result and corresponding original data in the input document may be caused to be highlighted.

These and other advantages of the invention will be apparent to those of ordinary skill in the art by reference to the following detailed description and the accompanying drawings.

BRIEF DESCRIPTION OF THE DRAWINGS

FIG. 5 shows a method for executing a long running robotic processing automation workflow for document processing, according to an embodiment of the invention;

FIG. 6 shows an exemplary user interface for validating a data extraction document processing activity of a long running workflow, according to an embodiment of the invention.

DETAILED DESCRIPTION

Figure 1:
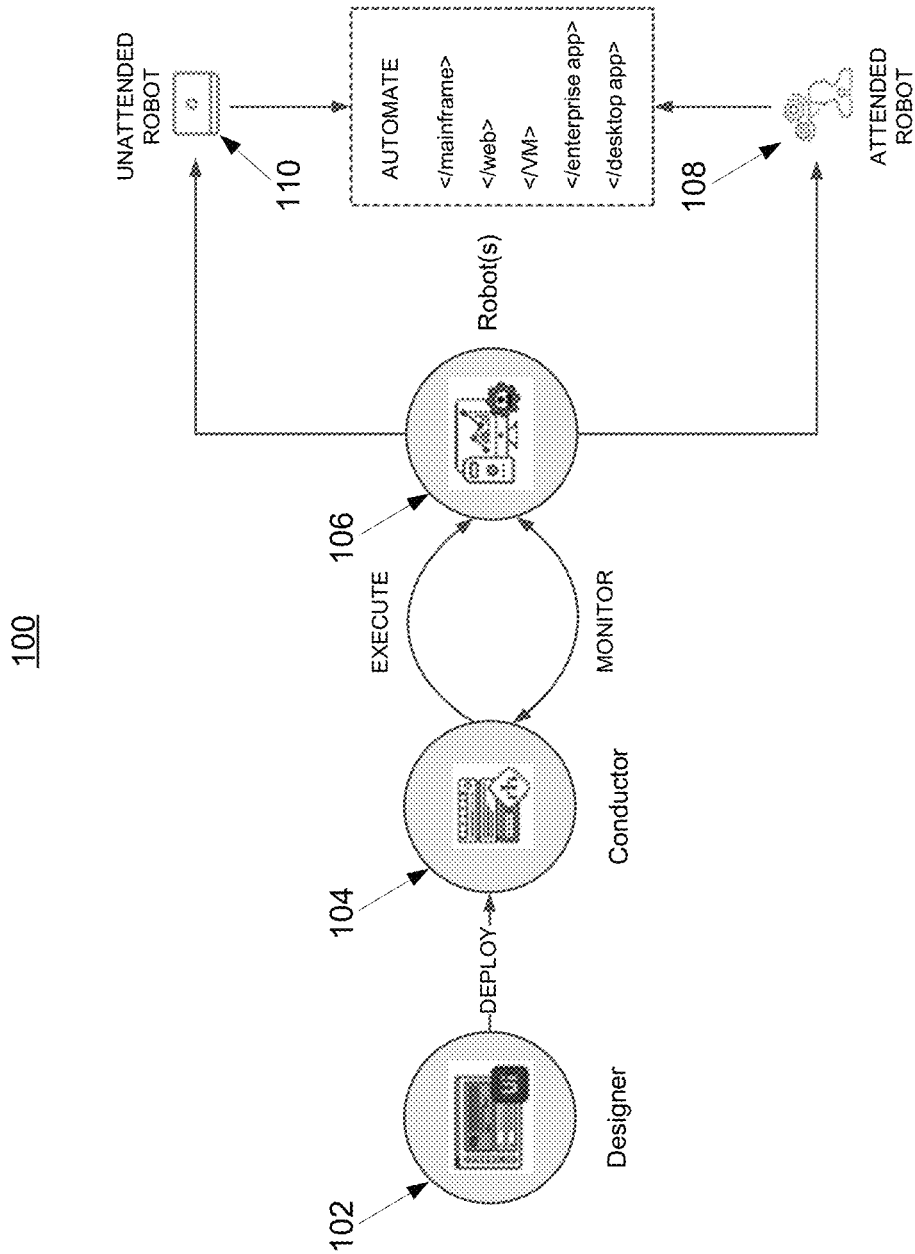
FIG. 1 is an architectural diagram illustrating a robotic process automation system, according to an embodiment of the invention.

Robotic process automation (RPA) is used for automating workflows. FIG. 1 is an architectural diagram of an RPA system 100, in accordance with one or more embodiments. As shown in FIG. 1, RPA system 100 includes a designer 102 to allow a developer to design automation processes using workflows. More specifically, designer 102 facilitates the development and deployment of workflows and robots for performing activities in the workflows. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 102, execution of business processes is orchestrated by a conductor 104, which orchestrates one or more robots 106 that execute the workflows developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run workflows built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP, SalesForce, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows© session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
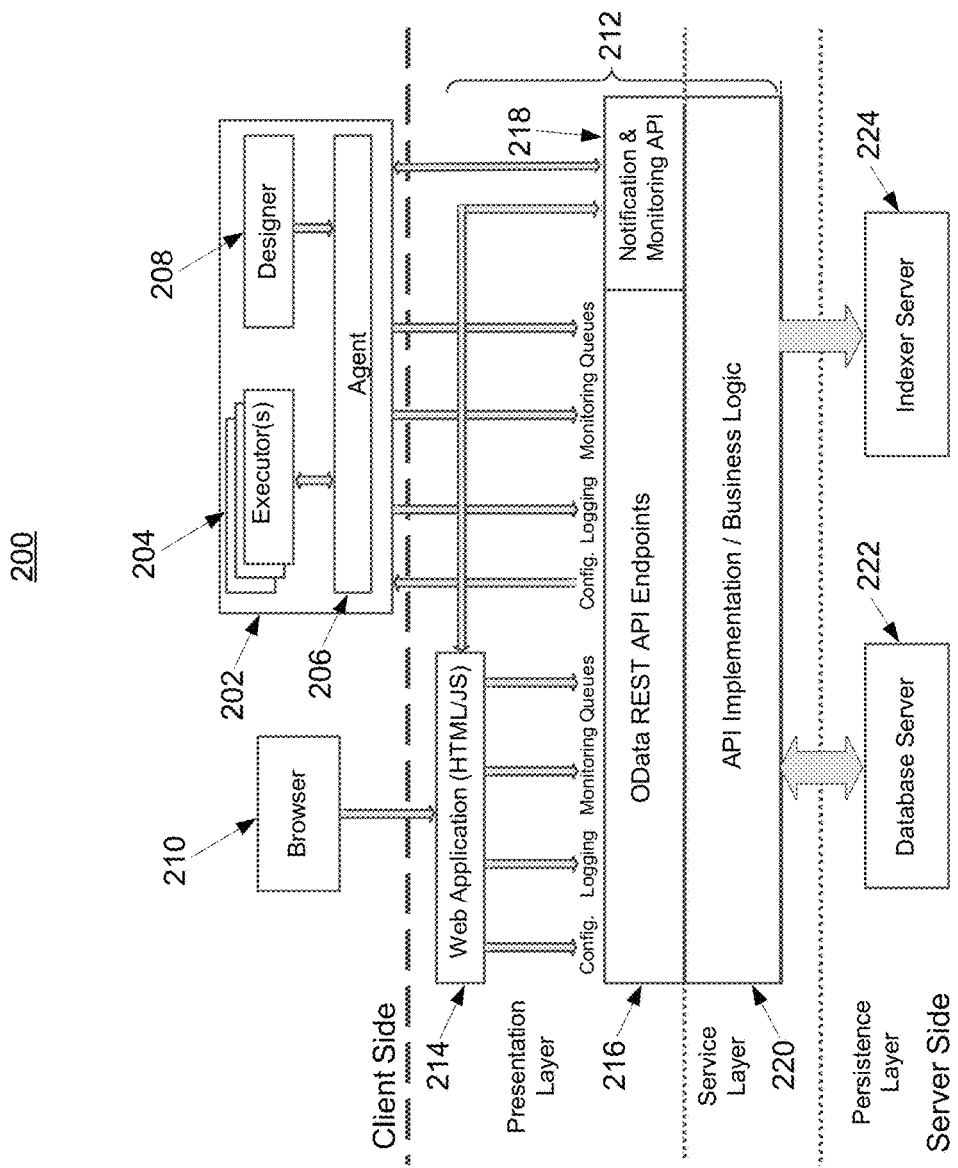
FIG. 2 is an architectural diagram illustrating an example of a deployed robotic process automation system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
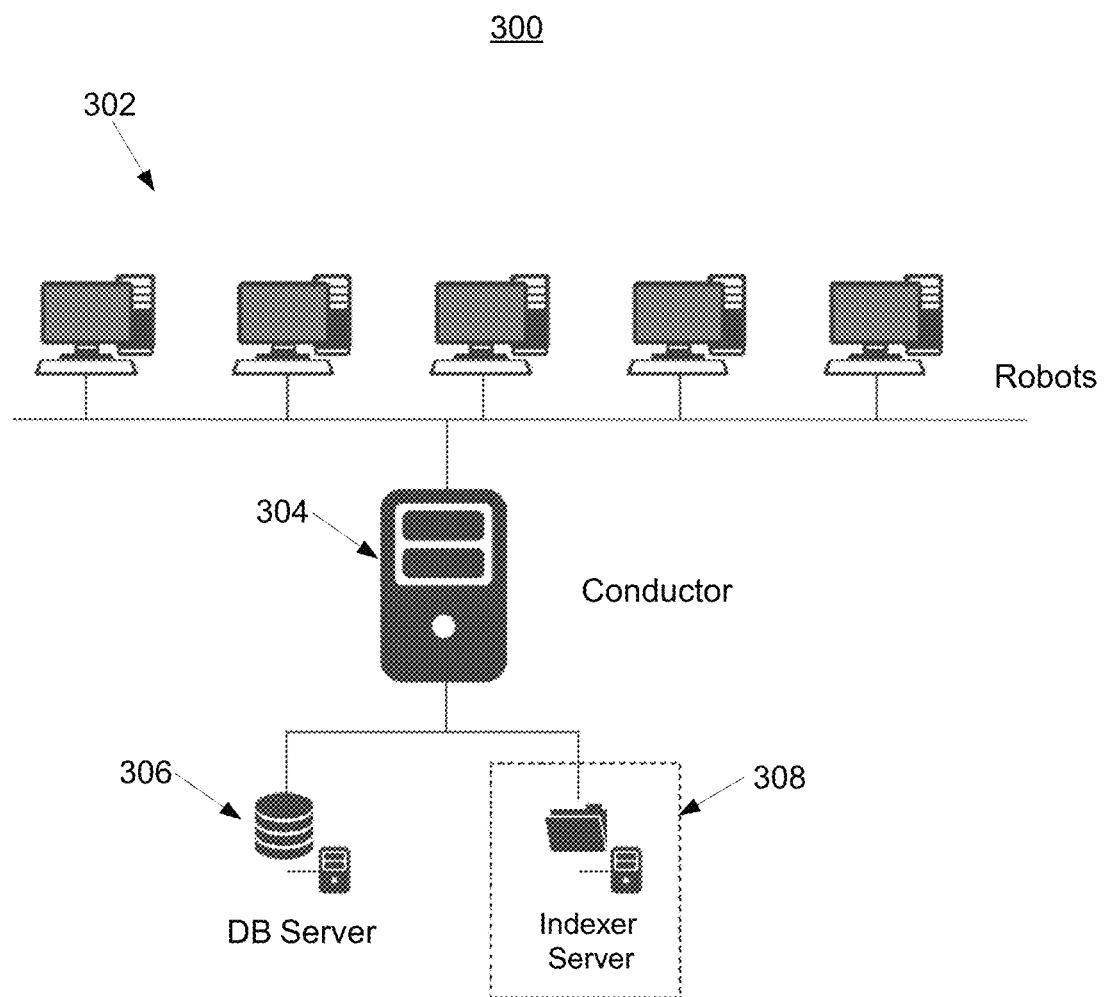
FIG. 3 is an architectural diagram illustrating a simplified deployment example of a robotic process automation system, according to an embodiment of the invention.

FIG. 3 is an architectural diagram illustrating a simplified deployment example of RPA system 300, in accordance with one or more embodiments. In some embodiments, RPA system 300 may be, or may include RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 300 may be implemented to execute long running workflows. As used herein, long running workflows are workflows that include one or more activities that depend on an occurrence of an external event in order to complete the activity. An external event of a particular long running workflow is any event that does not result from execution of the particular long running workflow. Long running workflows are performed over a relatively long period of time (e.g., hours or days) and may be suspended and resumed at any point in time to wait for the occurrence of the external event, thereby providing long running behavior to the workflow. In contrast, activities of non-long running workflows are executed in a continuous manner without waiting for external events.

In accordance with one particularly advantageous embodiment, RPA system 300 may be implemented to execute long running workflows for document processing. Document processing refers to operations performed on a document in order to structure some or all of the information in the document. Exemplary document processing operations include digitization, classification, and data extraction. In order to address potential errors resulting from the automated document processing, long running workflows may include a user validation activity to allow a user to validate the results of the document processing.

Figure 4:
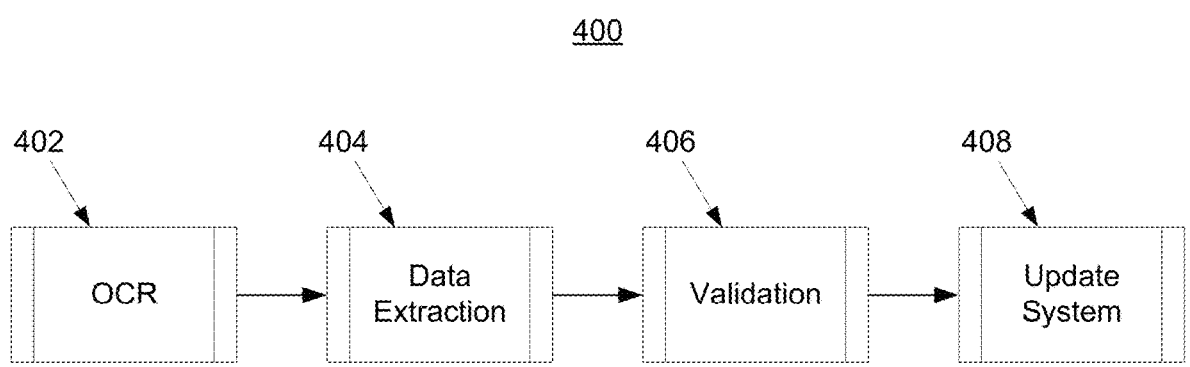
FIG. 4 shows an exemplary long running workflow for extracting data from an input document, according to an embodiment of the invention.

FIG. 4 shows an exemplary long running workflow 400 for extracting data from an input document, in accordance with one or more embodiments. Long running workflow 400 comprises robot activities 402, 404, and 408 and a user activity 406. Robot activity 402 defines a robot performing optical character recognition (OCR) on a document. Robot activity 404 defines a robot extracting data from the OCR results. User activity 406 defines a user validating the extracted data. Robot activity 408 defines a robot updating the system with the validated extracted data.

In long running workflow 400, user activity 406 depends on the occurrence of the external event of a user validating results of the data extraction. Execution of long running workflow 400 may be suspended while waiting for user input validating the data processing results and may be resumed once the user input has been received. The robot executing long running workflow 400 may be assigned to execute another workflow when execution of long running workflow 400 is suspended, thereby optimizing resources. Execution of long running workflow 400 may be resumed at activity 408 upon completion of activity 406 with the same or a different robot.

Long running workflows, such as, e.g., long running workflow 400 of FIG. 4, may be created by a user (e.g., an RPA developer) using, e.g., designer 102 of FIG. 1 or designer 208 of FIG. 2. For example, the user may interact with designer 102 or designer 208 to stitch together multiple fragmented activities (including fragmented shorter running workflows) to create a long running workflow. In one embodiment, the user creates the long running workflow by creating a new project (e.g., in designer 102 of FIG. 1 or designer 208 of FIG. 2) and selecting (e.g., dragging and dropping from a set of available activities and/or workflows) activities.

FIG. 5 shows a method 500 for executing a long running RPA workflow for document processing, in accordance with one or more embodiments. The steps of method 500 may be performed by one or more robots (e.g., attended robot 108 or unattended robot 110 of FIG. 1 or robots 302 of FIG. 3) running on a computing device (e.g., computing system 700 of FIG. 7). Method 500 will be described with reference to long running workflow 400 of FIG. 4.

At step 502, one or more document processing activities of the long running workflow are executed by a first robot to process an input document. The first robot may be any suitable robot for executing RPA workflows. In one embodiment, the first robot is an unattended robot. The document processing activities may be any robot activity for processing documents that are serializable, such as, e.g., OCR, digitization, classification, and data extraction. In one example, the document processing activities are robot activity 402 for OCR and robot activity 404 for data extraction in long running workflow 400. The activities may be invoked in an asynchronous non-blocking manner. In one embodiment, the activities include non-UI activities that may be invoked in a synchronous blocking manner or in an asynchronous blocking manner. Non-UI activities may include, for example, calls to external systems (e.g., an API call to an SAP (Systems Applications and Products) system to retrieve data). The calls may be executed in an asynchronous manner, meaning that the call to the API is performed and the handling of the returned data is defined at the same time, and the thread proceeds with other logic. A synchronous call, on the other hand, executes the call, waits and blocks the thread until the data is received, and then proceeds with the data handling.

At step 504, execution of the long running workflow is suspended by the first robot in response to a user validation activity of the long running workflow. The user validation activity is for validating results of the one or more document processing activities. In one example, the user validation activity is user activity 406 for validating extracted data in long running workflow 400. The long running workflow is suspended for an indefinite period of time to wait for user input in the form of validation of the results of the one or more document processing activities from the end user.

To suspend the execution of the long running workflow, the current context of the long running workflow at the time of suspension is serialized. Serialization of the current context of the long running workflow refers to the process of translating the current state of the long running workflow (data variables and their values) into a format that can be stored and later reconstructed. The current context of the long running workflow is stored in a central persistent storage, such as, e.g., database server 222 of FIG. 2 or database server 306 of FIG. 3.

Figure 6:
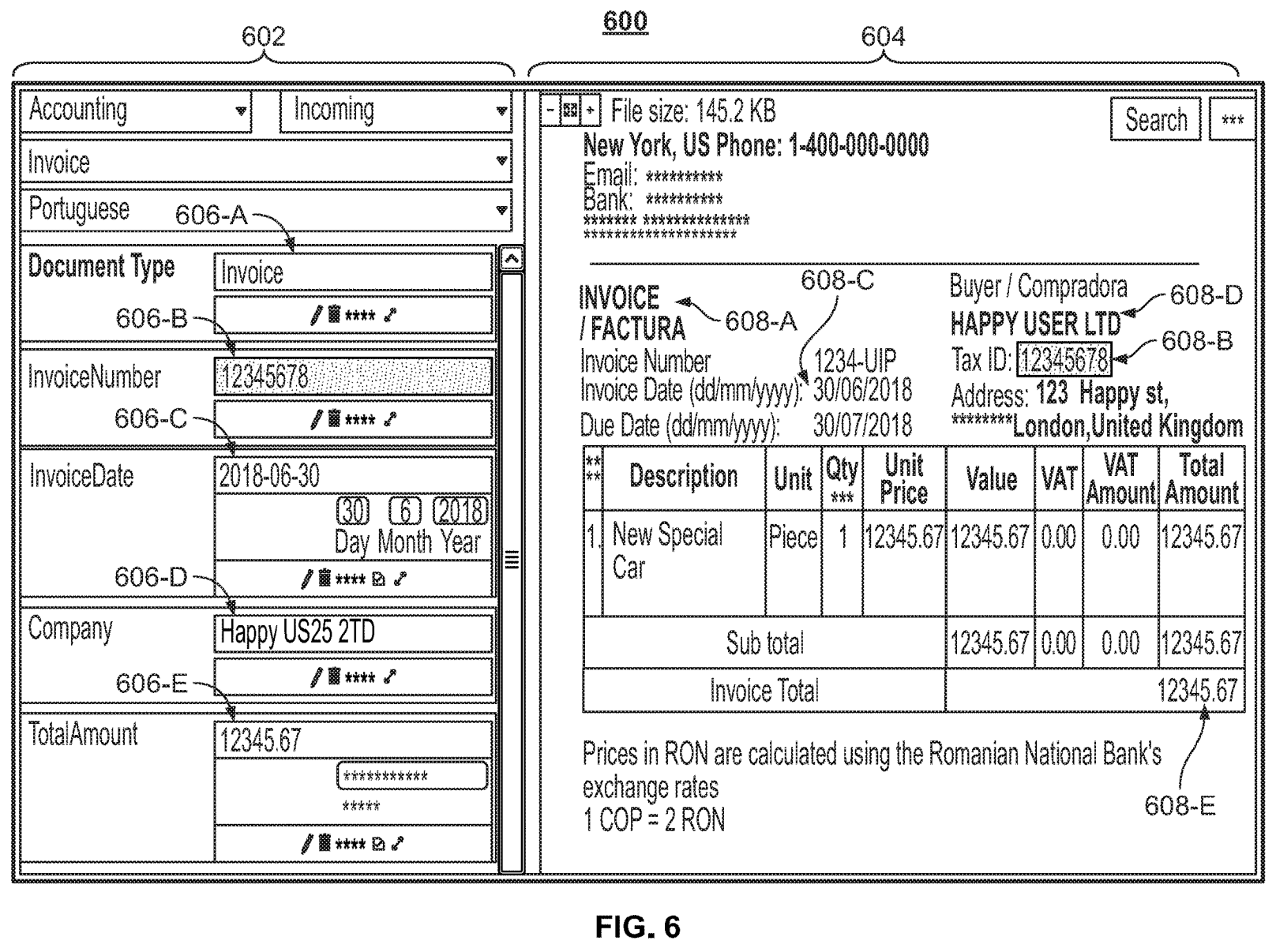

At step 506, a user request requesting validation of the results from the end user is generated. The user request may include the input document, a digitized version of the input document, classification information associated with the input document, and results of the one or more document processing activities. In one embodiment, the user request may include a user interface enabling the end user to validate the results of the one or more document processing activities. The user interface allows for the presentation of information of the user request so as to best assist the user in completing the validation. The user interface may be configured according to the business use case needs. An exemplary user interface is shown in FIG. 6, described in further detail below.

At step 508, the user request is transmitted to the end user. The user request notifies the end user that user input is required for validating the results of the one or more document processing activities. In response to the user request, the end user may interact with the user request to validate the results of the one or more document processing activities by selecting the document processing results, comparing the document processing results with the input document, and correcting the document processing results.

In one embodiment, a notification indicating that validation of the results of the one or more document processing activities is requested is also transmitted to the end user. The notification may include a link, or otherwise direct the end user to, the user interface to enable the end user to validate the results. The notification may be a mobile device notification, text message, email, etc.

At step 510, the execution of the long running workflow is resumed by the second robot based on the validation received from the end user. For example, the execution of long running workflow 400 may be resumed by executing robot activity 408 for updating the system based on user input received for user activity 406 validating results of the data extraction. The validation of the results of the one or more document processing activities received from the end user may comprise an indication that the results of the one or more document processing are or are not accurate and/or a corrected results of the one or more document processing activities.

The second robot may be any suitable robot for executing RPA workflows (e.g., an unattended robot). The first robot and the second robot may be the same robot or different robots. In one embodiment, the second robot is a first available robot in a pool of available robots associated with the long running workflow.

In one embodiment, execution of the long running workflow is resumed by retrieving the current context of the long running workflow from the central persistent storage (e.g., database server 222 of FIG. 2 or database server 306 of FIG. 3). Accordingly, even if the long running workflow was later updated or modified (e.g., after suspension of the execution of the long running workflow), execution of the long running workflow is resumed using the workflow state (data variables and their values) at the time of suspension, which was stored in the central persistent storage.

The long running workflow may be suspended any number of instances. Accordingly, method 500 may iterate by returning to step 504 each time the resumed long running workflow is suspended in response to a user validation activity until execution of the long running workflow is complete.

While the steps of method 500 may be performed by one or more robots, coordination of those steps are managed by an orchestrator, such as, e.g., conductor 104 of FIG. 1, conductor 212 of FIG. 2, or conductor 304 of FIG. 3. Specifically, with respect to method 500, the orchestrator transmits an indication to execute the one or more document processing activities to the first robot to perform step 502, transmits an indication to suspend the execution of the long running workflow to the first robot to perform step 504, receives the generated user request (generated at step 506) from the first robot and transmits the generated user request to the end user to perform step 508, receives validation of the results of the one or more document processing activities from the end user in response to the user request, and transmits an indication to resume the execution of the long running workflow to the second robot to perform step 510. Accordingly, the long running workflow is coordinated in a centralized manner by the orchestrator but may be executed in a decentralized manner by different robots.

Advantageously, the suspending and resuming of long running workflows allows for optimal resource allocation for performing the long running workflows without the need for continuous monitoring or waiting by a robot.

FIG. 6 shows a user interface 600 for validating a data extraction document processing activity of a long running workflow performed on an input document, in accordance with one or more embodiments. A similar user interface may be provided for other document processing activities (e.g., OCR, digitization, classification, etc.). User interface 600 may be presented to an end user in response to the end user interacting with a user request requesting validation of the results of the data extraction. In one embodiment, the user request may have been transmitted to the end user at step 508 of method 500 of FIG. 5.

User interface includes view 602 showing results of the data extraction and view 604 showing the input document that the one or more document processing activities are applied to. In one embodiment, views 602 and 604 are shown in user interface 600 in a side-by-side configuration to facilitate validation of the results of the one or more document processing activities by the end user. As shown in FIG. 6, views 602 and 604 are in a left and right side-by-side configuration, however other configurations are possible (e.g., top and bottom, etc.).

View 602 depicts extracted document type data 606-A, extracted invoice number data 606-B, extracted invoice date data 606-C, extracted company name data 606-D, and extracted total amount data 606-E (collectively referred to as extracted data 606) extracted from respective corresponding original data 608-A-608-E (collectively referred to as original data 608) of the input document, depicted in view 604. User interface 600 is configured to show extracted data 606 in view 602 alongside original data 608 in view 604, which enables the end user to validate the automatically determined extracted data 606.

The end user may interact with views 602 and/or 604 to facilitate the validation of extracted data 606. In one embodiment, the end user may select extracted data 606 in view 602 to highlight the extracted data 606 in view 602 and its corresponding original data 608 in view 604 (or similarly, the user may select original data 608 in view 604 to highlight the original data 608 and its corresponding extracted data 606). For example, as shown in FIG. 6, extracted invoice number data 606-B is selected by an end user to highlight extracted invoice number data 606-B and its corresponding original data 608-B. As shown in FIG. 6, extracted invoice number data 606-B is extracted as an invoice number in view 602, but is extracted from original data 608-B as the tax ID in view 604. Accordingly, extracted invoice number data 606-B and its corresponding original data 608-B is an example of an erroneous data extraction that a user may correct using user interface 600. In one embodiment, a user may select a word or a sequence of words from the input document in view 604 as original data 608 and assign the selection as a value for a field as extracted data 606 in view 604, thus adding or changing data to the extracted data 606. While extracted invoice number data 606-B and its corresponding original data 608-B are described as being highlighted in FIG. 6, it should be understood that the selected extracted data 606 and original data 608 may be depicted in user interface 600 in any suitable manner so as to draw the attention of the end user, such as, e.g., font, font style (e.g., bold, italics), font size, font color, etc.).

In one embodiment, the end user may validate extracted data 606 by comparing extracted data 606 with original data 608 and correcting extracted data 606, e.g., by deleting, adding, correcting, and/or replacing extracted data 606 based on the comparison. In another embodiment, the end user may validate extracted data 606 by providing an indication of whether extracted data 606 is accurate. Once validated, the end user may submit the validated extracted data 606 and transmit the validation to the orchestrator, to thereby resume execution of the long running workflow.

Figure 7:
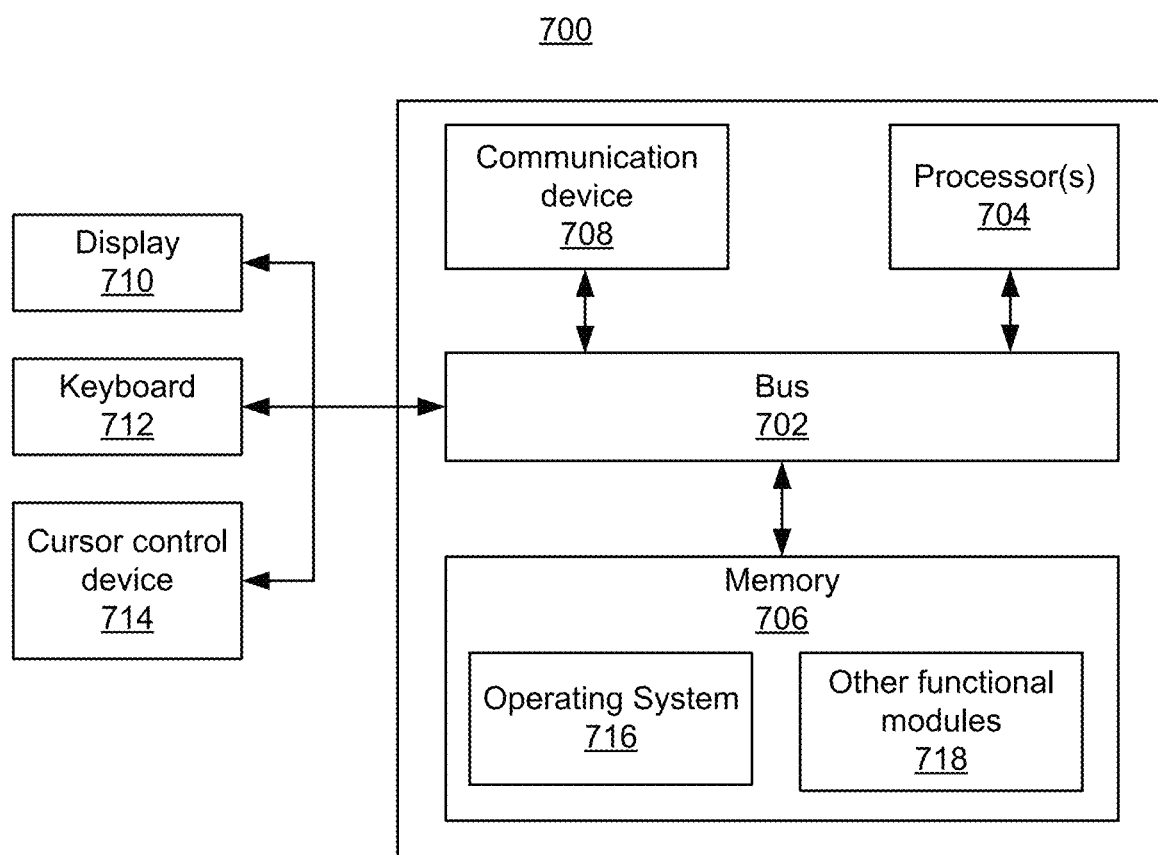
FIG. 7 is a block diagram of a computing system according to an embodiment of the invention.

FIG. 7 is a block diagram illustrating a computing system 700 configured to execute the methods described in reference to FIG. 4, according to an embodiment of the present invention. In some embodiments, computing system 700 may be one or more of the computing systems depicted and/or described herein. Computing system 700 includes a bus 702 or other communication mechanism for communicating information, and processor(s) 704 coupled to bus 702 for processing information. Processor(s) 704 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 704 may also have multiple processing cores, and at least some of the cores may be configured to perform specific functions. Multi-parallel processing may be used in some embodiments.

Computing system 700 further includes a memory 706 for storing information and instructions to be executed by processor(s) 704. Memory 706 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 704 and may include volatile media, non-volatile media, or both. The media may also be removable, non-removable, or both.

Additionally, computing system 700 includes a communication device 708, such as a transceiver, to provide access to a communications network via a wireless and/or wired connection according to any currently existing or future-implemented communications standard and/or protocol.

Processor(s) 704 are further coupled via bus 702 to a display 710 that is suitable for displaying information to a user. Display 710 may also be configured as a touch display and/or any suitable haptic I/O device.

A keyboard 712 and a cursor control device 714, such as a computer mouse, a touchpad, etc., are further coupled to bus 702 to enable a user to interface with computing system. However, in certain embodiments, a physical keyboard and mouse may not be present, and the user may interact with the device solely through display 710 and/or a touchpad (not shown). Any type and combination of input devices may be used as a matter of design choice. In certain embodiments, no physical input device and/or display is present. For instance, the user may interact with computing system 700 remotely via another computing system in communication therewith, or computing system 700 may operate autonomously.

Memory 706 stores software modules that provide functionality when executed by processor(s) 704. The modules include an operating system 716 for computing system 700 and one or more additional functional modules 718 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for executing a robotic process automation (RPA) workflow for document processing comprising:
   executing one or more document processing activities of the RPA workflow by a first robot to process an input document;
   suspending execution of the RPA workflow by the first robot in response to a user validation activity of the RPA workflow, the user validation activity for validating results of the one or more document processing activities;
   generating a user request requesting validation of the results from an end user;
   transmitting the user request to the end user;
   resuming the execution of the RPA workflow by a second robot based on the validation received from the end user; and
   causing display of a user interface depicting the input document and the results for presentation to the end user in a side-by-side configuration.

2. The computer-implemented method of claim 1, wherein the validation received from the end user comprises an indication of whether the results are accurate.

3. The computer-implemented method of claim 1, wherein the validation received from the end user comprises corrected results of the one or more document processing activities.

4. The computer-implemented method of claim 1, wherein the one or more document processing activities comprise one or more of optical character recognition, digitization, classification, or data extraction.

5. The computer-implemented method of claim 1, further comprising:
   transmitting a notification to the end user indicating that validation of the results is requested.

6. The computer-implemented method of claim 1, wherein the first robot and the second robot are the same robot.

7. The computer-implemented method of claim 1, wherein the first robot and the second robot are different robots.

8. A computer-implemented method for executing a robotic process automation (RPA) workflow for document processing comprising:
    executing one or more document processing activities of the RPA workflow by a first robot to process an input document;
    suspending execution of the RPA workflow by the first robot in response to a user validation activity of the RPA workflow, the user validation activity for validating results of the one or more document processing activities;
    generating a user request requesting validation of the results from an end user;
    transmitting the user request to the end user;
    resuming the execution of the RPA workflow by a second robot based on the validation received from the end user; and
    causing display of a user interface depicting the input document and the results for presentation to the end user, wherein causing display of a user interface depicting the input document and the results for presentation to the end user comprises:
        receiving a selection of a particular result of the results of the one or more document processing activities from the end user; and
        causing the particular result and corresponding original data in the input document to be highlighted.

9. The computer-implemented method of claim 8, wherein the validation received from the end user comprises an indication of whether the results are accurate.

10. The computer-implemented method of claim 8, wherein the validation received from the end user comprises corrected results of the one or more document processing activities.

11. The computer-implemented method of claim 8, wherein the one or more document processing activities comprise one or more of optical character recognition, digitization, classification, or data extraction.

12. The computer-implemented method of claim 8, further comprising:
    transmitting a notification to the end user indicating that validation of the results is requested.

13. The computer-implemented method of claim 8, wherein the first robot and the second robot are the same robot.

14. The computer-implemented method of claim 8, wherein the first robot and the second robot are different robots.

15. A system for executing a robotic process automation (RPA) workflow for document processing comprising:
    a memory storing computer instructions; and
    at least one processor configured to execute the computer instructions, the computer instructions configured to cause the at least one processor to perform operations of:
        executing one or more document processing activities of the RPA workflow by a first robot to process an input document;
        suspending execution of the RPA workflow by the first robot in response to a user validation activity of the RPA workflow, the user validation activity for validating results of the one or more document processing activities;
        generating a user request requesting validation of the results from an end user;
        transmitting the user request to the end user;
        resuming the execution of the RPA workflow by a second robot based on the validation received from the end user; and
        causing display of a user interface depicting the input document and the results for presentation to the end user in a side-by-side configuration.

16. The system of claim 15, wherein the validation received from the end user comprises an indication of whether the results are accurate.

17. The system of claim 15, wherein the validation received from the end user comprises corrected results of the one or more document processing activities.

18. The system of claim 15, wherein the one or more document processing activities comprise one or more of optical character recognition, digitization, classification, or data extraction.

19. The system of claim 15, the operations further comprising:
    transmitting a notification to the end user indicating that validation of the results is requested.

20. The system of claim 15, wherein the first robot and the second robot are the same robot.

21. The system of claim 15, wherein the first robot and the second robot are different robots.

22. A computer program embodied on a non-transitory computer-readable medium for executing a robotic process automation (RPA) workflow for document processing, the computer program configured to cause at least one processor to perform operations comprising:
    executing one or more document processing activities of the RPA workflow by a first robot to process an input document;
    suspending execution of the RPA workflow by the first robot in response to a user validation activity of the RPA workflow, the user validation activity for validating results of the one or more document processing activities;
    generating a user request requesting validation of the results from an end user;
    transmitting the user request to the end user;
    resuming the execution of the RPA workflow by a second robot based on the validation received from the end user; and
    causing display of a user interface depicting the input document and the results for presentation to the end user in a side-by-side configuration.

23. The computer program of claim 22, wherein the validation received from the end user comprises an indication of whether the results are accurate.

24. The computer program of claim 22, wherein the validation received from the end user comprises corrected results of the one or more document processing activities.

25. The computer program of claim 22, wherein the one or more document processing activities comprise one or more of optical character recognition, digitization, classification, or data extraction.

26. The computer program of claim 22, the operations further comprising:
    transmitting a notification to the end user indicating that validation of the results is requested.

27. The computer program of claim 22, wherein the first robot and the second robot are the same robot.

28. The computer program of claim 22, wherein the first robot and the second robot are different robots.

29. A system for executing a robotic process automation (RPA) workflow for document processing comprising:
- a memory storing computer instructions; and
- at least one processor configured to execute the computer instructions, the computer instructions configured to cause the at least one processor to perform operations of:
  - executing one or more document processing activities of the RPA workflow by a first robot to process an input document;
  - suspending execution of the RPA workflow by the first robot in response to a user validation activity of the RPA workflow, the user validation activity for validating results of the one or more document processing activities;
  - generating a user request requesting validation of the results from an end user;
  - transmitting the user request to the end user;
  - resuming the execution of the RPA workflow by a second robot based on the validation received from the end user; and
  - causing display of a user interface depicting the input document and the results for presentation to the end user, wherein causing display of a user interface depicting the input document and the results for presentation to the end user comprises:
    - receiving a selection of a particular result of the results of the one or more document processing activities from the end user; and
    - causing the particular result and corresponding original data in the input document to be highlighted.

30. A computer program embodied on a non-transitory computer-readable medium for executing a robotic process automation (RPA) workflow for document processing, the computer program configured to cause at least one processor to perform operations comprising:
- executing one or more document processing activities of the RPA workflow by a first robot to process an input document;
- suspending execution of the RPA workflow by the first robot in response to a user validation activity of the RPA workflow, the user validation activity for validating results of the one or more document processing activities;
- generating a user request requesting validation of the results from an end user;
- transmitting the user request to the end user;
- resuming the execution of the RPA workflow by a second robot based on the validation received from the end user; and
- causing display of a user interface depicting the input document and the results for presentation to the end user, wherein causing display of a user interface depicting the input document and the results for presentation to the end user comprises:
  - receiving a selection of a particular result of the results of the one or more document processing activities from the end user; and
  - causing the particular result and corresponding original data in the input document to be highlighted.

\* \* \* \* \*